Jan. 15, 1935. G. W. BOOTH Re. 19,422
CONTAINER CLOSURE
Original Filed Sept. 16, 1932 3 Sheets-Sheet 1
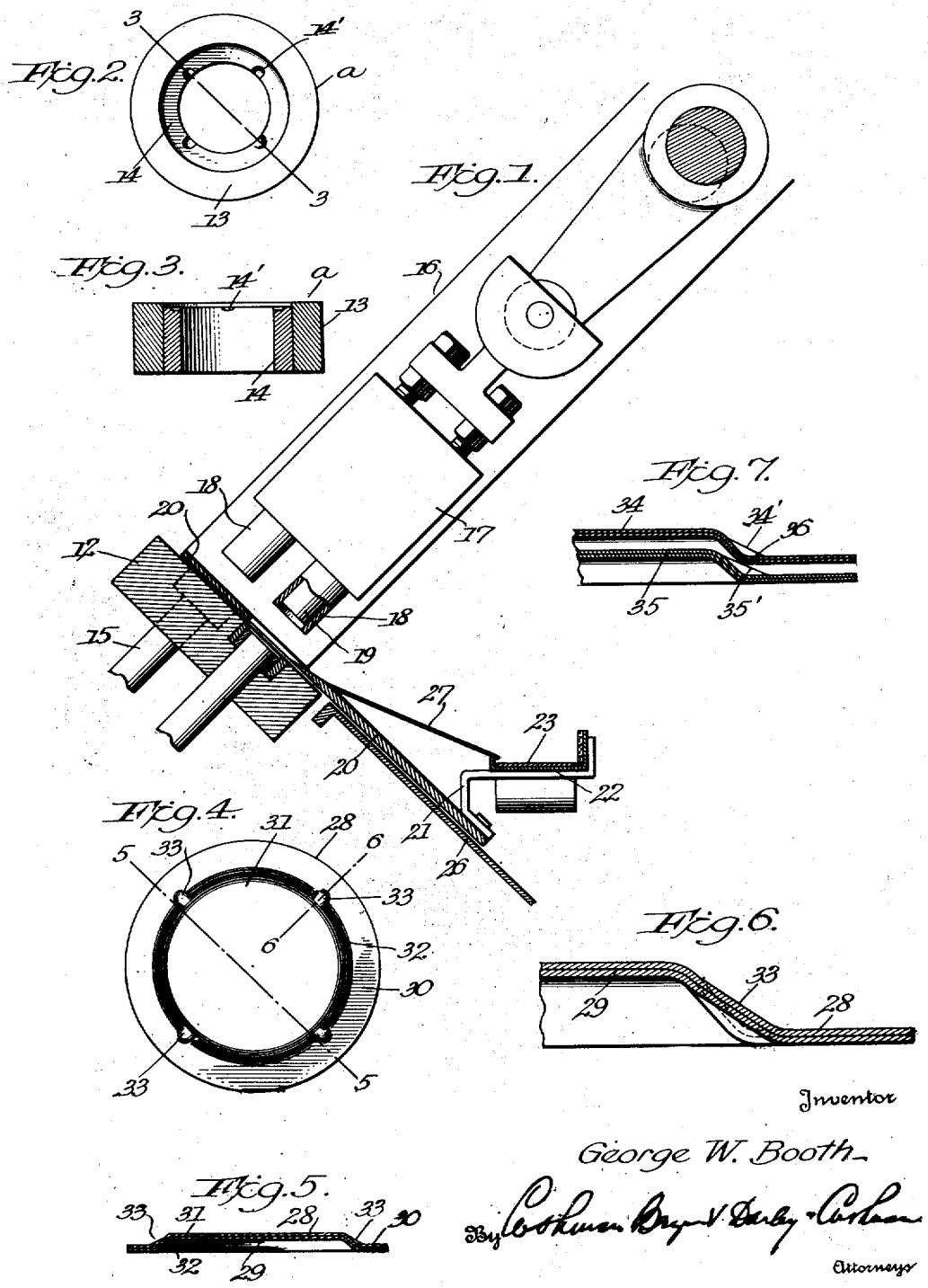
Inventor
George W. Booth
By Cochran, Bryan & Darby & Cochran
Attorneys Jan. 15, 1935. G. W. BOOTH Re. 19,422
CONTAINER CLOSURE
Original Filed Sept. 16, 1932 3 Sheets-Sheet 2
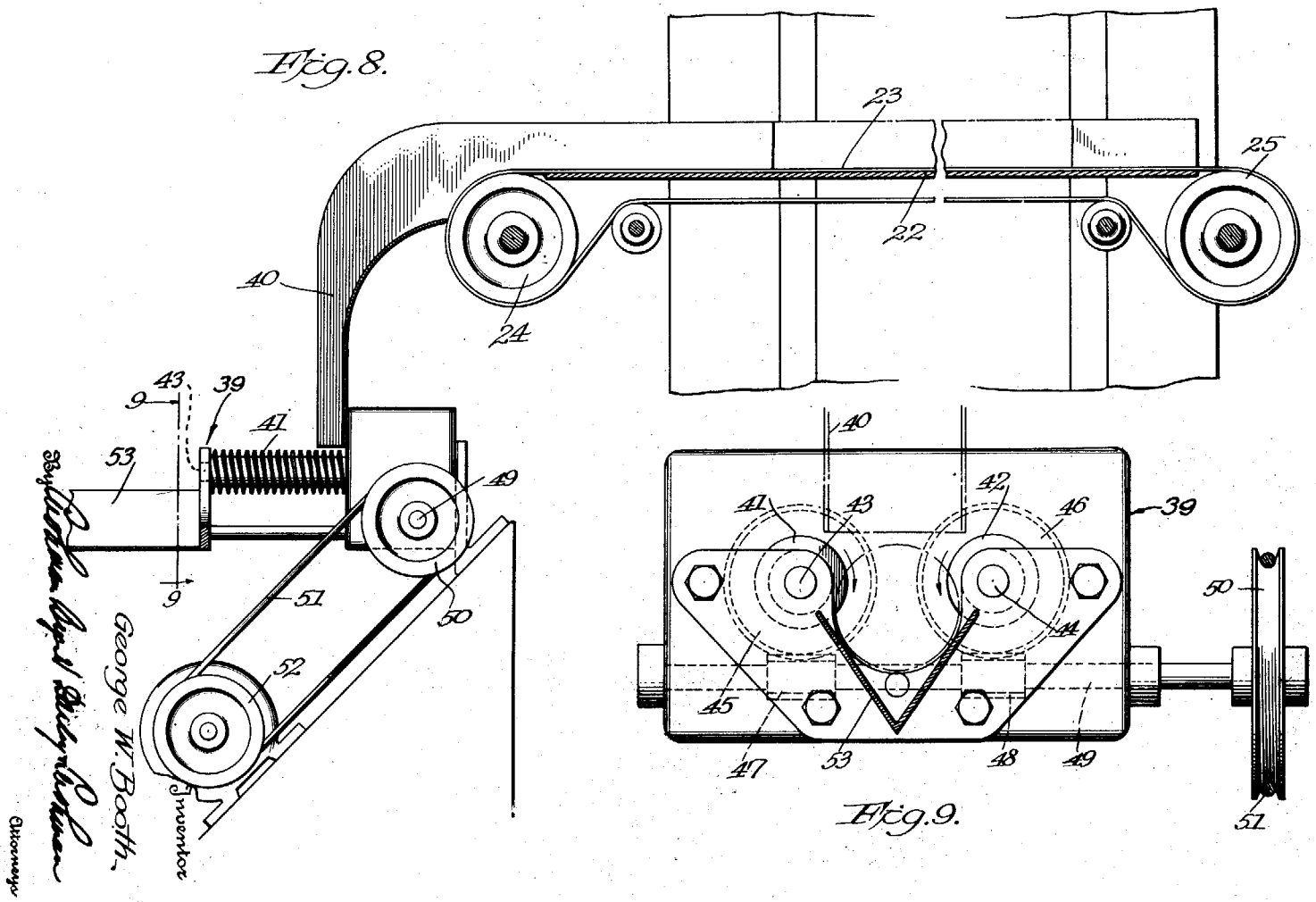

Jan. 15, 1935. G. W. BOOTH Re. 19,422

CONTAINER CLOSURE

Original Filed Sept. 16, 1932 3 Sheets-Sheet 3

Inventor

George W. Booth

By Rochman, Cooper & Harley, Rochman

Attorneys

Reissued Jan. 15, 1935 Re. 19,422

UNITED STATES PATENT OFFICE 19,422

CONTAINER CLOSURE

George W. Booth, Baltimore, Md., assignor to Crown Cork & Seal Company, Inc., Baltimore, Md., a corporation of New York Original No. 1,956,212, dated April 24, 1934, Serial No. 633,515, September 16, 1932. Application for reissue October 5, 1934, Serial No. 747,108

1 Claim. (Cl. 220—97)

The present invention relates to container closures of the type designed to be fed from a stack and has to do with the form of the closure and a method for producing and stacking the closures so that adequate spacing of the closures in the stack is afforded.

In order that the closures may be surely separated and fed, it is desirable that they be stacked in uniformly spaced relation and such spacing is particularly necessary where the closures are cupped so as to tend to nest together tightly. While the present invention is of general application, I shall describe it with particular reference to a type of closure shown in my copending application Serial No. 553,464, filed July 27, 1931, in the United States Patent Office. In the application referred to, I have shown a closure in the form of a substantially flat disc comprising metal and fibrous laminations adhesively united, the metal lamination being ductile so that the marginal portion of the disc may be ironed and drawn over a container bead to take a natural locking crimp therebeneath. As a desirable feature in the stamping of such closure discs, the diameter of the disc is somewhat reduced in the stamping operation by slightly off-setting the central from the marginal portion thereof so that a shoulder is presented at the inner edge of the marginal portion. I have found that where a lamination of fibrous material is used as the sealing facing, the bending thereof in forming the shoulder causes a slight breaking and fraying of the fibres at the bend and that these fibres, when the discs are stacked, engage the adjacent disc surface with sufficient frictional effect to impair the feeding operation. In order to overcome this objectionable feature, I provide the discs, according to the present invention, with protuberances in such manner that the protuberances of no two adjacent discs can come completely into register and even spacing of all the discs is thereby secured. The provision of these protuberances and the proper stacking of the discs to assure that no two discs with similarly spaced protuberances shall be adjacent, gives rise to certain problems with the solution of which the present invention is also concerned.

With this general introduction, I shall proceed to describe the invention with reference to the accompanying drawings which are illustrative, but by no means restrictive, thereof.

In the drawings,

Figure 1 is a cross section through a multiple punch stamping machine and associated conveyor;

Figure 2 is a plan view of cutting and forming dies forming parts of the punching mechanism;

Figure 3 is a section on the line 3—3 of Figure 2;

Figure 4 is a plan view of a closure disc produced by the illustrated punching mechanism;

Figure 5 is a section on line 5—5 of Figure 4;

Figure 6 is a greatly enlarged section on line 6—6 of Figure 4.

Figure 7 shows in section portions of two stacked discs;

Figure 8 is an elevation partly in section of the conveyor mechanism shown in Figure 1 and its associated stacking mechanism;

Figure 9 is a section on line 9—9 of Figure 8;

Figure 10:
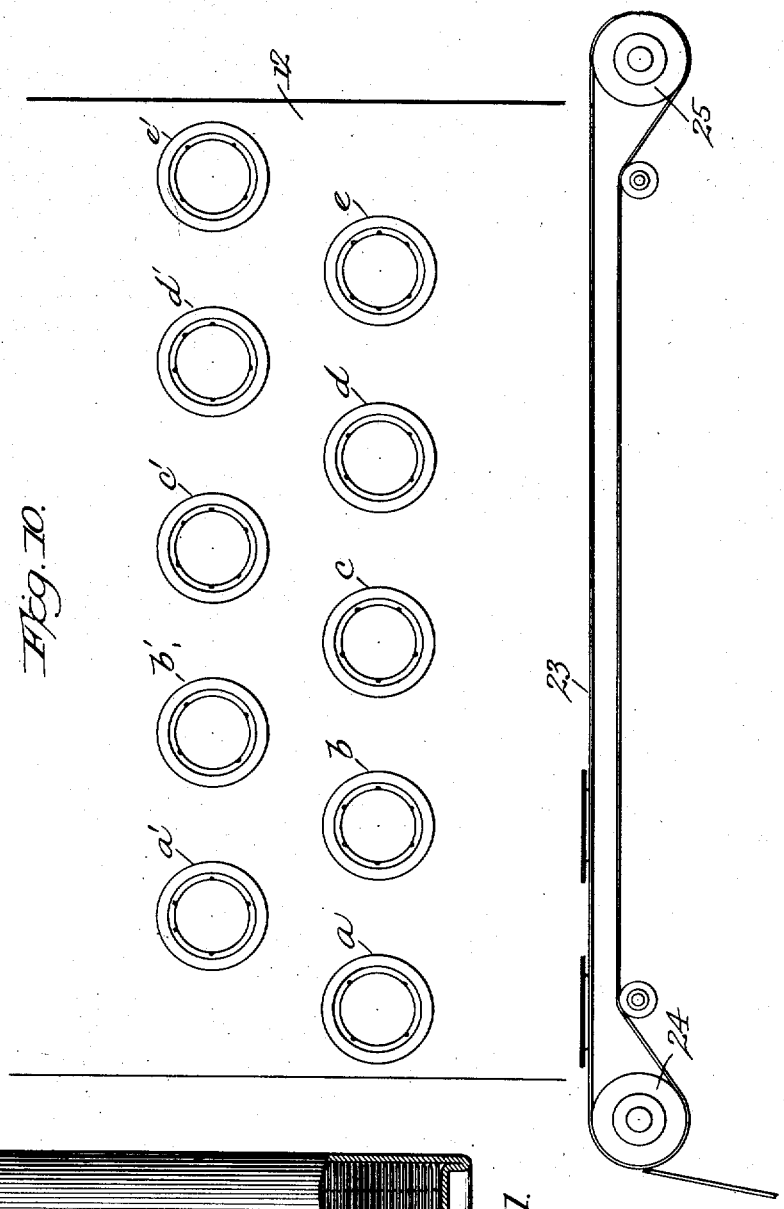
Figure 10 shows in plan the bed of the punching mechanism, the conveyor being shown in elevation.

Referring to the drawings and particularly to Figures 1 to 3 and 10, reference numeral 12 designates the inclined bed of suitable stamping apparatus, the bed having arranged therein the two rows of dies *a* to *e* and *a'* to *e'*, Figure 10, the dies of one row being staggered relative to those of the other. As particularly shown in Figures 2 and 3, each die comprises a cylindrical blanking die 13 and a cylindrical forming die 14 and as here shown, the top inner edge of the forming die is provided with notches 14' spaced at ninety degree intervals, the die shown in Figures 2 and 3 and in Figure 1 in cross section being the die *a*, Figure 10.

The bed is provided with bores concentric with the dies and extending through the bores and into the several dies are the upwardly spring pressed and reciprocable ejecting plungers 15.

Guided in the frame 16 for reciprocation at right angles to the bed is a head 17 in which are mounted the usual cutting punches 18 and forming punches 19, the former being adapted to cooperate with the dies 13 and the latter with the dies 14. A stripper plate 20 is spaced a suitable distance above bed 12 and provided with apertures through which the stamped blanks may be ejected. The stripper plate is continued beyond the lower edge of the bed and at its extremity supports brackets 21 upon which is mounted a plate or trough 22 which supports the upper run of a conveyor belt 23, the conveyor being coextensive with the bed and including head and foot pulleys 24 and 25, Figure 10, the former of which may be driven from any suitable means and at a speed related to the speed of operation of the punching mechanism. Preferably the head pulley is driven through suitable gearing from a rotary shaft of the punching mechanism.

An apron 26 is spaced below the projecting portion of the stripper plate 20 and forms with the latter a guide through which sheet material is fed to the stamping apparatus. An inclined apron 27 is arranged to guide the stamped closures to the conveyor 23.

In the operation of the apparatus, a sheet of material being fed to the punching apparatus, head 17 descends and the cutting punches 18 in cooperation with the dies 13, cut out discs whose marginal portions overlie dies 14 and are gripped between the top surfaces of the latter and the lower ends of the cutting punches. Hereupon the forming punches 19 are moved relative to the cutting punches and within the upper ends of the forming dies a limited distance so that the central portions of the discs are downwardly off-set relative to their marginal portions and the disc metal is drawn into the notches 14', corresponding indentations being formed on the opposite side of the discs. Since the die 14 has four notches 14', the disc produced thereby will have four protuberances bridging the angle between the marginal portion of the disc and its central portion and angularly spaced about the disc center. The sheet is fed with its fibrous facing up so that the protuberances are on the metal faces of the blanks.

The blanks from dies *a* to *e* and *a'* to *e'* are all ejected simultaneously and ordinarily pass to the conveyor 23 in the order *a*, *a'*, *b*, *b'*, etc., due to the staggered relation of the dies of the two rows. According to the invention, no two successive discs will have the same arrangement of protuberances so that since the discs are intended to be stacked in the order in which they reach the conveyor 23, the protuberances of no two adjacent discs can completely register and the discs will therefore be held in spaced relation by the protuberances. Theoretically, it will suffice if all of the discs produced by punches *a* to *e* had the same arrangement of protuberances and if the discs produced by punches *a'* to *e'* had, as among themselves, the same arrangement of protuberances but an arrangement different from that of discs *a* to *e*. However, in order to be on the safe side, it is preferred that each disc have an arrangement of protuberances different from that of all the other discs. Thus, as shown in Figure 10, each die has a different arrangement of notches, this arrangement by way of illustration, being as follows:

| Die No. | Notches | Spacing—degrees |
|---|---|---|
| *a'* | 5 | 70—40—70—70—110 |
| *b'* | 4 | 102—78—102—78 |
| *c'* | 6 | 55—80—45—55—80—45 |
| *d'* | 5 | 82—57—57—82—82 |
| *e'* | 4 | 115—75—75—95 |
| *a* | 4 | 90—90—90—90 |
| *b* | 6 | 60—60—60—60—60—60 |
| *c* | 5 | 72—72—72—72—72 |
| *d* | 4 | 118—62—118—62 |
| *e* | 6 | 47—86—47—47—86—47 |

It is, of course, desirable and essential, unless all the discs of each series have differently spaced protuberances, to run conveyor 23 at such a speed relative to the stamping apparatus that the discs formed in any one operation will reach the conveyor 23 only after the discs of the previous operation have been moved out of the way. That is to say, the disc formed in one operation by the die *e'* should be moved by the conveyor 23 beyond the position of the disc formed by the die *a* in the succeeding operation before the latter disc reaches the conveyor. Any suitable drive means are therefore provided to enable the conveyor 23 to be driven at a speed related to the speed of operation of the stamping apparatus to the end that there shall be no overlapping on conveyor 23 of discs produced by successive operations.

The disc produced by die *a* is shown in Figures 4, 5, and 6, reference numeral 28 designating a lamination of ductile metal and 29 a lamination of fibrous material such as paper butter chip, or the like. The disc constituted by these laminations, while substantially flat, has a marginal portion 30 from which is upwardly offset slightly a central portion 31, an annular shoulder 32 joining the two portions. At four points spaced at ninety degrees, the angle between the shoulder 32 and marginal portion 30 of the disc is bridged by protuberances 33. Each protuberance is substantially angular in cross section, that is, in a plane passing therethrough at right angles to the sectional plane of Figure 6 and the ridge line of each protuberance is substantially rectilinear as shown in Figure 6 and extends between the shoulder and the flat marginal portion of the closure member. This disposition of protuberances is preferred, although not essential, since upon application of the disc to the beaded mouth of the container in the manner described in my above mentioned application, the protuberances do not interfere with the capping operation and are, moreover, drawn out during the capping operation, disappearing so that smooth conformation of the disc margin to the upper external surface of the bead is secured.

In Figure 7, two stacked discs 34 and 35 are shown, the protuberance 34' of disc 34 being considered to be somewhat behind the protuberance 35' of disc 35 so that an unmutilated or undistorted portion of the annular edge 36 contacts with the protuberances 35' to maintain the discs in properly spaced relation. It is at this edge 36 that the somewhat broken condition of the fibres, above referred to, occurs.

It will be noted that preferably the height, or at least the effective height, of the protuberances is less than the height of the central offset portion of the disc. As can be seen from Figure 7, the result is that while the discs are spaced apart, their offset portions are still somewhat nested.

Figure 11:
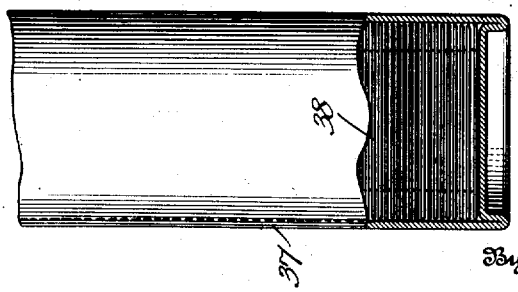
Figure 11 shows in axial cross section a package of the new closure discs.

In Figure 11, reference numeral 37 designates a tubular container or package receiving a considerable number of discs, generally designated at 38, in stacked relation, uniform spacing of the discs being maintained by their protuberances. It will be understood that with the protuberances of each disc differently spaced from those of the adjacent disc or discs, one protuberance of one disc may register with an indentation of the superposed disc but the remaining protuberances of said one disc will serve to maintain the spacing of the discs. Preferably the spacing of the protuberances is such that each disc is supported by the subjacent disc against tilting.

Referring to Figures 8 and 9, conveyor 23 delivers to stacking mechanism 39 by means of a chute 40. The stacking mechanism comprises a pair of oppositely threaded and inwardly rotating screws 41 and 42 fixed on suitably journaled shafts 43 and 44, the shafts having fixed thereto worm wheels 45 and 46 engaged by worms 47 and 48 fixed on a suitably journaled shaft 49. Shaft 49 has a pulley 50 fixed on one end thereof and connected through a drive belt 51 with a motor pulley 52. In the well known manner, discs falling from chute 40 have their edges gripped by the threads of screws 41 and 42 and are advanced into a triangular stacking trough 53 at the delivery end of the screws, the discs being taken from the trough for packaging in the manner shown in Figure 11.

It will be understood that the invention is not necessarily limited as to the form of cap to which it is applicable nor to the manner of treatment of the cap to secure the spacing means. Obviously the invention is not limited as to the apparatus used in carrying it out. I do not limit myself in any of these respects except as determined in the following claim.

I claim:

A container closure in the form of a substantially flat ductile disc having a substantially flat marginal portion and a portion offset to form an annular shoulder portion inwardly of said marginal portion, the angle between said marginal portion and shoulder portion being bridged at widely spaced intervals around the shoulder portion by protuberances having substantially straight ridge lines extending between the shoulder portion and marginal portion, said protuberances serving to prevent full nesting of the closure with a similar closure.

GEORGE W. BOOTH.